US009091609B2

(12) United States Patent
Micai

(10) Patent No.: US 9,091,609 B2
(45) Date of Patent: Jul. 28, 2015

(54) ENCAPSULATED ELECTRONIC PRESSURE SENSOR

(71) Applicant: Emicol Eletro Eletrônica S.A., Itu (São Paulo) (BR)

(72) Inventor: José Claudio Micai, Itu (BR)

(73) Assignee: EMICOL ELETRO ELECTRONICA S.A., Itu (Sao Paulo) (BR)

( * ) Notice: Subject to any disclaimer, the term of this patent is extended or adjusted under 35 U.S.C. 154(b) by 255 days.

(21) Appl. No.: 13/776,000

(22) Filed: Feb. 25, 2013

(65) Prior Publication Data

US 2013/0220022 A1    Aug. 29, 2013

(30) Foreign Application Priority Data

Feb. 29, 2012  (BR) ............................ 102012004522

(51) Int. Cl.
| G01L 19/04 | (2006.01) |
| G01L 19/14 | (2006.01) |
| D06F 39/08 | (2006.01) |
| G01L 19/06 | (2006.01) |

(52) U.S. Cl.
CPC ............ *G01L 19/149* (2013.01); *D06F 39/087* (2013.01); *G01L 19/0627* (2013.01); *G01L 19/0681* (2013.01)

(58) Field of Classification Search
USPC ................................................... 73/700–756
See application file for complete search history.

(56) References Cited

U.S. PATENT DOCUMENTS

| 6,532,650 | B1 * | 3/2003 | Kirchdoerffer ................. 29/841 |
| 2004/0050170 | A1 * | 3/2004 | Koch et al. ...................... 73/756 |
| 2009/0235754 | A1 * | 9/2009 | Tseng et al. .................... 73/754 |
| 2011/0303016 | A1 * | 12/2011 | Gutierrez et al. ............... 73/719 |

* cited by examiner

*Primary Examiner* — Andre Allen
(74) *Attorney, Agent, or Firm* — Volpe and Koenig, P.C.

(57) ABSTRACT

A protective casing for a household appliance includes an encapsulation and a support fitted therein. The support has an upper recess for the sensor, also housing a cushion with a central hole, and an electrical connector; and the encapsulation with a horizontal structural portion, from which a mechanical engagement, a bed and a connection project. The bed is generally cylindrical, with a flat top with a central hole and an octagonal side surface with alternate round and flat walls, the internal surface delimited by the walls has a similar and/or cooperative geometry with the side surface of the support. Particularly, a bottom surface, the cushion and top of the bed define an open chamber, housing the sensor. The chamber being in fluid communication with the source of the pressure to be measured through the lumen of the connector and the central hole as included on the top of the bed.

7 Claims, 3 Drawing Sheets

ENCAPSULATED ELECTRONIC PRESSURE SENSOR

FIELD OF THE INVENTION

The present invention refers to an electronic pressure sensor, primarily intended for use in household appliances. More particularly, the present invention refers to a protective casing for an encapsulated electronic sensor.

BACKGROUND

In the industry field of consumer goods known as household appliances, it is very usual to employ pressure sensors, such as for household appliances as washing machines and dishwashers, etc. Through those sensors, it is possible e.g. to determine the volume of water inside the tub of a washing machine and others.

Currently, this kind of sensor consists of an encapsulated silicon chip, which is directly soldered to a base, i.e. over a printed circuit board, more specifically over the control board of the washing machine. An example of a pressure sensor of this kind is the model MP3V5004G, manufactured by the company Freescale Semiconductor, Inc. However, besides its electrical connection on the control board of the equipment, it is also required that the sensor surface of that chip is equally connected to the place which pressure we desire to measure. Said connection is usually made by means of a hose.

Although the current solution is effective regarding the capacity and viability of the measurements as effected, eventual interventions for maintenance and/or repair in said types of equipments have resulted potentially hazardous, due to the mechanical link between the control board of the equipment and the water reservoir.

So to solve said inconvenience, manufacturers have been using, among others, the technique to insert the control board in a mechanically resistant structure (e. g. a box with an open face), besides providing for indirect connection between the tub hose and the sensor. In other words, inside the support box for the control board, a pressure transference structure for the reservoir is formed/fixed, which structure is composed by two male connectors with fluid communication. Therefore, the hose coming from the reservoir is attached to one of the connectors and a second hose, linking the first hose to the sensor surface of the above-mentioned chip, is attached to the other connector. Thus, said transference structure works as mechanical isolation between the liquid reservoir and the pressure sensor.

Despite this solution having been shown effective in practice, it leads to an unnecessary increase in production costs, besides generating other problems.

Considering that said sensor is directly welded to the control board of the equipment, when said sensor has a malfunction, or even just a suspicion of wrong operation, it is necessary to remove and substitute the whole control board of the equipment. Vice versa, if the control board or just one of its elements has a malfunction, the current technique forces the substitution of the whole set (box, control board, transference structure, second hose, etc.), thus causing a waste of components and naturally bringing in a cost increase for the consumer owner of the equipment.

SUMMARY

Therefore, a first object of the present invention is constituted by an encapsulated sensor, as well as the corresponding encapsulating casing, allowing the pressure sensor to be electrically indirectly connected to the control board of the equipment, mechanically not linked to the control board of the equipment, and also resistant enough to endure any mechanical aggressions received, both during use and in events of maintenance and/or repair of said equipment.

An encapsulated sensor as well as the respective encapsulating casing constitute another object of the present invention, which cost for production is lower than observed in the solutions currently in use.

These and other objects are met by the present invention, disclosing an encapsulated electronic pressure sensor, comprising a sensor chip intended to measure a fluid pressure and comprising encapsulation and a support fitted in said encapsulation. Therefore, said support has in its upper portion a recess for the sensor chip, wherein said recess still lodges a cushion, with a hole in its center, as well as an electrical connector, projecting downwards from a lower face of the support, wherein the terminals of said electrical connector are electrically connected to the outlet terminals of the sensor chip; said encapsulation comprising a horizontally-developed structural portion from which a mechanical engagement, a bed and a connection project, wherein said bed has an approximately cylindrical form, with a flat top and a hole in its center, and an octagonal side surface with alternatively round and flat walls, the internal surface limited by said walls presenting similar and/or cooperative geometry with the side surface of the support; the bottom surface of the support recess, the cushion and the top of the bed of the encapsulation defining an open chamber, inside which the sensor chip is located, wherein said chamber is located in fluid communication with the source of pressure to be measured by the sensor chip through the light of the connector of the central hole as included on the top of the bed.

BRIEF DESCRIPTION OF DRAWINGS

The present invention will be better understood from the detailed description as follows, concerning a preferable and not limitative way of embodiment, which is made by reference to the attached figures, wherein.

DETAILED DESCRIPTION OF THE PREFERRED EMBODIMENTS

As shown in the attached figures, 1 generically indicates an encapsulated pressure sensor basically comprising an encapsulation 2 receiving the retention support 4 and the sensor chip connection 5. Preferably, the encapsulation 2 is made of a rigid and electrically isolating plastic material.

Figure 3:
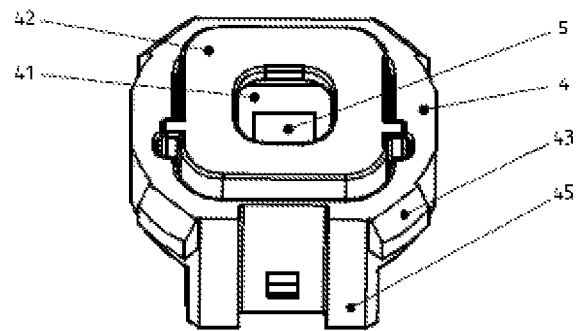
FIG. 3 is an upper perspective view of the sensor chip as inserted in its specific support.

As better viewed in FIG. 3, the support 4 has the form of an octagonal coin or a flat octagonal prism with alternatively flat and arched side surfaces, in which center a recess 41 is included, intended to receive the sensor chip 5. The periphery of said recess 41 receives a cushion 42 with a central hole, so to define fluid communication to the sensor surface of the sensor chip 5. In some of the side surfaces of the support 4 (on four of said surfaces, such as shown by the present way of embodiment), teeth 43 are included to engage the support 4 into the encapsulation 2, as will be explained further below.

Furthermore, from the lower surface 44 of the support 4, an electrical connector 45 is projected, which terminals (not visible) are electrically connected to the outlet terminals of the sensor chip 5. Therefore, and by means of the electrical connector 45, both said sensor chip 5 is fed and the electrical signals relative to pressure reading are transferred. Particularly and in a preferable way of embodiment of the present invention, the sensor chip 5 can supply two types of outlet signal: an outlet with linear tension which is proportional to the applied pressure (i. e. tension varies with pressure fluctuation); or an outlet by frequency proportional to the pressure as applied (i. e. varying the outlet frequency with the pressure variation).

Figure 1:
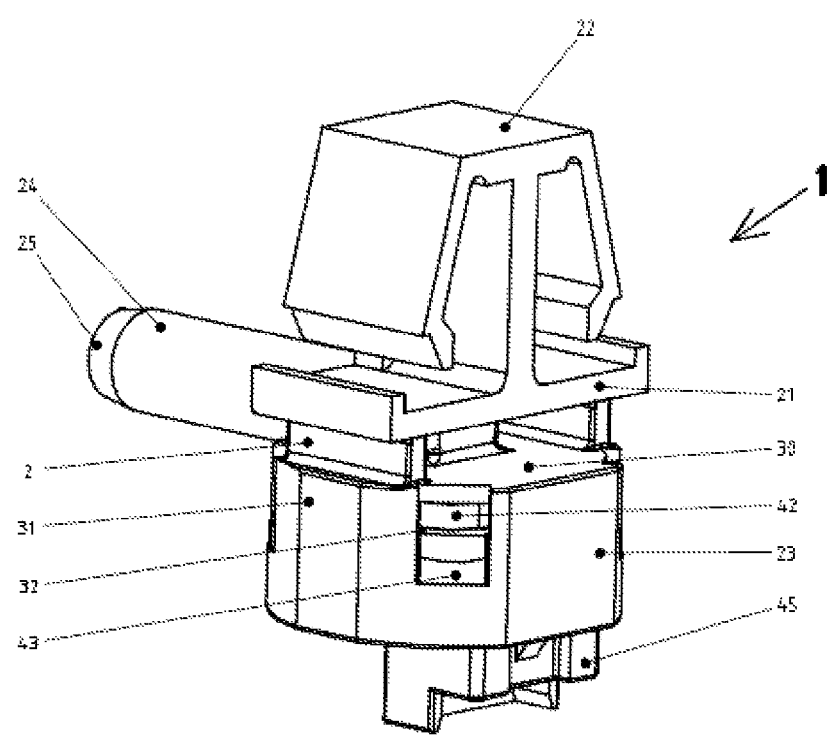
FIG. 1 is a perspective view of the encapsulated electronic pressure sensor of the present invention, with the sensor chip duly inserted within its protection capsule.
Figure 2:
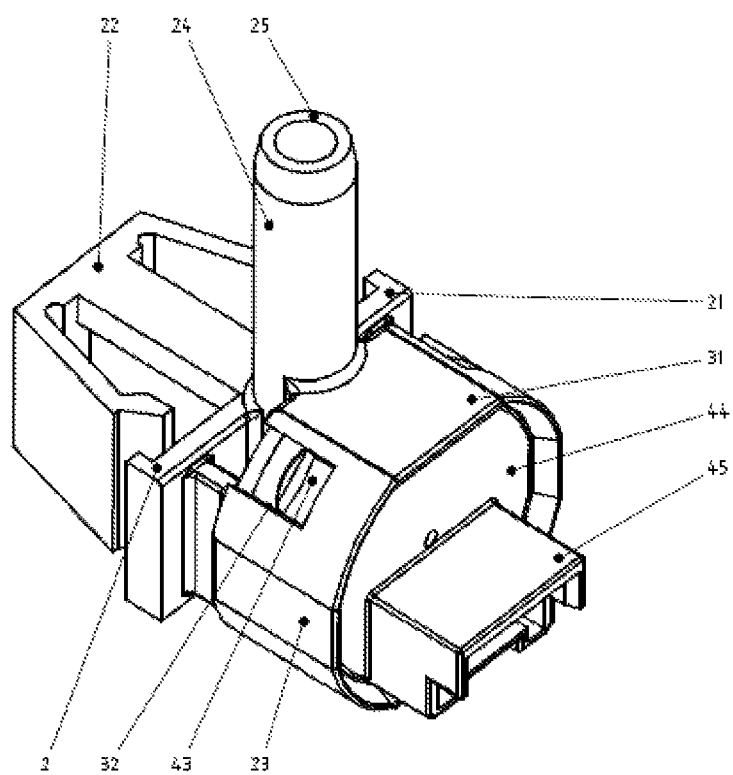
FIG. 2 is another view, now in lower perspective, of the encapsulated pressure sensor of FIG. 1.

With particular attention to FIGS. 1 and 2, encapsulation 2 comprises a horizontally developed structural portion 21, from which a mechanical engagement 22, a bed 23 and a connection 24 project.

More specifically, the engagement 22 serves to fix the encapsulation set to an appropriate spot on the equipment to which the encapsulated pressure sensor 1 will be fixed. Therefore, said engagement 22 can assume the shape as shown (engagement with flexible wings), and can also present any other conception so to cooperate with a respective lodgment/fitting as included in said equipment. Besides this solution by "click"-type mechanical engagement, it is also possible to include an engagement 22 in the form of a projection provided with external/internal screw to be bolted to a corresponding structure as included in the equipment. However and preferably, the engagement of the encapsulated pressure sensor 1 is removable, so to allow its eventual substitution in case of maintenance and/or repair of the equipment.

The connector 24 has a cylindrical shape inside it, so to allow fluid communication between its edge 25 and the sensor 5. Specifically, the connector 24 projects in co-planar form from and in relation to the structural portion 21. The measurements of the connector 24 are such to allow it to penetrate inside the hose (not shown) making the fluid connection between the tub (in the way of embodiment as presently shown) of the washing machine and the sensor 5. On the other hand, the internal edge of the connector 24, in opposition to the edge 25, ends in a 90° curve, thus resulting in fluid communication between said connector 24 and the top 30 of the bed 23.

Specifically concerning the bed 23, it has an approximately cylindrical form, with a flat top 30 with a central hole (not visible in the Figures) and an octagonal side surface 31 with alternate round walls. The internal surface as defined by said walls has similar and/or cooperative geometry to the side surface o periphery of the support 4; therefore, the support 4 can penetrate inside the bed 23 by sliding, with no relative deflection between said support 4 and said bed 23.

Therefore, the side surface 31 of the bed 23 still has windows 32 in the same number and relative position regarding the teeth 43 of the support 4. Said windows 32 are located on the upper portion of the side surface 31 of the bed 23 and have dimensions so to keep the support 4 in a pre-determined position inside said bed 23. Particularly, the final distance (in the assembled condition of the support 4 inside the arm 23) between the top 30 and the upper portion of the support 4 corresponds exactly to the projecting height of the cushion 42 over the upper portion of the support 4.

As a result of said construction, the central portion with a hole of the cushion 42 defines, jointly with the top 30 of the bed 23, a chamber communicating with the outside (via the light of the connector 24 and the central hole of the top 30 of the bed 23), thus putting the sensor 5 in fluid contact with the source of pressure to be measured (a tub, in this illustrative form of embodiment).

Furthermore, so to avoid leakage and/or loss of pressure inside said chamber, the plastic cushion 42 can be glued to inside the support 4 and the arm 23. Alternatively, the cushion 42 may be jointly located with a sealing (not shown) made of a pliant material such as synthetic or natural rubber, or any other resilient material.

As a result, the pressure sensor 1 of the present invention is extremely strong and easily handled. Particularly, the structure involving the sensor chip 5 is very solid, providing very effective protection against eventual mechanical and electrical shocks (due to the isolating nature of the confection material of the encapsulation 2). Furthermore, when fully encapsulating the sensor chip 5, it can be easily handled with no risks to its integrity and not compromising the integrity of the control board of the equipment wherein it is installed (usually, household appliances).

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. Encapsulated electronic pressure sensor (1), comprising a sensor chip (5) configured to measure fluid pressure, comprising an encapsulation (2) and a support (4) fitted into said encapsulation (2), wherein: said support (4) comprises, on an upper side thereof, a recess (41) for the sensor chip (5), wherein said recess (41) also houses a cushion (42) with a central hole, as well as an electrical connector (45), projecting downwards from the lower face of the support (4), wherein the terminals of said electrical connector (45) are electrically connected to the outlet terminals of the sensor chip (5); and said encapsulation (2) comprises a horizontal structural portion (21), from which a mechanical engagement (22), a bed (23) and a connector (24) project, wherein said bed (23) has a cylindrical conformation, with a flat top (30) with a central hole and an octagonal side surface (31) with alternate round and flat walls, wherein the internal surface delimited by said walls have a similar and/or cooperative geometry with the side surface of the support (4); the bottom surface of the recess (41) of the support (4), the cushion (42) and the top (30) of the bed (23) of the encapsulation defining an open chamber, inside which the sensor chip (5) is located, wherein said chamber is in fluid communication with a source of the pressure to be measured by the sensor chip (5) through the light of the connector (24) and the central hole as included on the top (30) of the bed (23).

2. The sensor of claim 1, wherein the support (4) further comprises alternately projecting teeth (43) from an external side surfaces of said support (4).

3. The sensor of claim 1, wherein said engagement (22) of the encapsulated pressure sensor (1) is removable.

4. The sensor of claim 1, wherein the connector (24) has a cylindrical shape with a hole, with a first edge (25) and an internal edge, as opposed to the first edge (25), ending at a 90° curve, being a lumen of the connector (24) in fluid communication with the central hole of the top (30) of the bed (23).

5. The sensor of claim 2, wherein the bed (23) comprises windows (32) in the same number and relative position over the teeth (43) of the support (4), said windows (32) are located on the upper portion of the side surface (31) of the bed (23).

6. The sensor of claim 1, wherein the cushion (42) is kept under compression or adherence in an assembled condition of the support (4) inside the bed (23) of the encapsulation (2).

7. The sensor of claim 1, wherein the sensor chip (5) supplying one of the following kinds of outlet signal: an outlet with linear tension proportional to the pressure as applied, or a frequency outlet proportional to the pressure as applied.

\* \* \* \* \*